W. B. NEWLON.
Device for Moving Car.
No. 216,441.    Patented June 10, 1879.
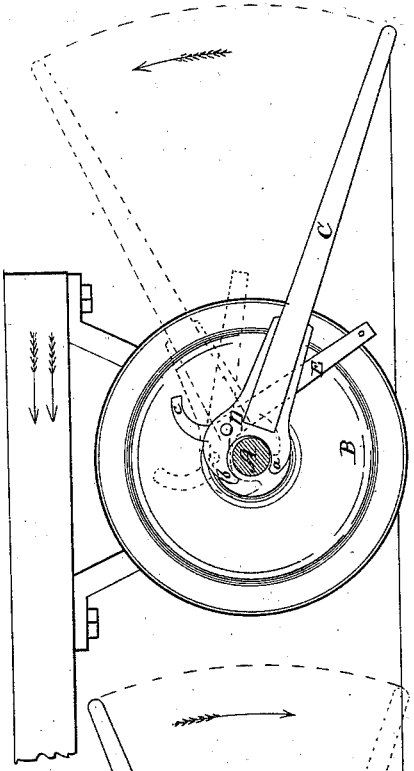
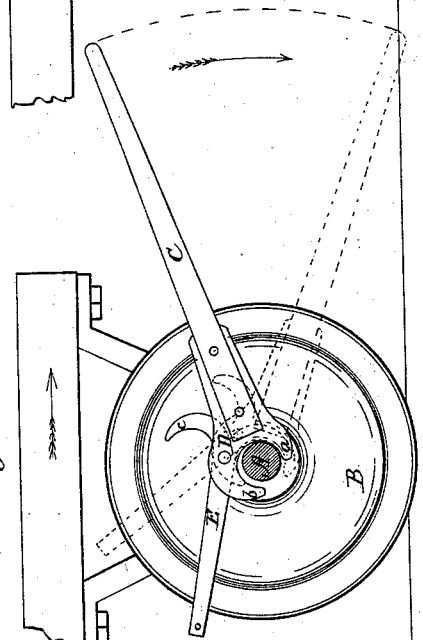
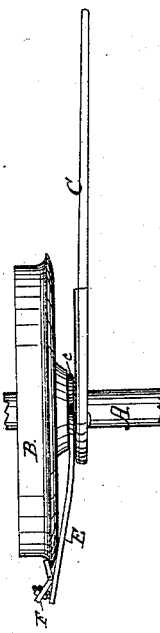
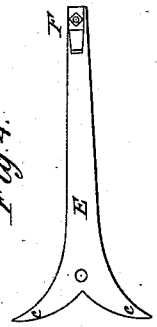
WITNESSES:
INVENTOR:

UNITED STATES PATENT OFFICE.

WILLIAM B. NEWLON, OF FREMONT, NEBRASKA.

IMPROVEMENT IN DEVICES FOR MOVING CARS.

Specification forming part of Letters Patent No. 216,441, dated June 10, 1879; application filed April 24, 1879.

*To all whom it may concern:*

Be it known that I, WILLIAM B. NEWLON, of Fremont, in the county of Dodge and State of Nebraska, have invented a new and Improved Device for Moving Cars; and I do hereby declare that the following is a full, clear, and exact description of the same.

My invention is an improvement in that class of implements for moving railway-cars, manually or by human force, which consists of a lever adapted for attachment to the car-axle, and having a lateral arm for engaging the rim or tread of one of the wheels.

My invention is embodied in a lever having one end formed into or provided with an open hook, which adapts it to be detachably connected with a car-axle, and a dog which is pivoted to the hook, and so constructed as to clutch the flange of the wheel, either on one side or the other, so that when the free end of the lever is alternately raised and depressed the dog will correspondingly clutch and slide on the flange, and cause the axle and wheels to revolve, thereby moving the car forward.

The implement is designed for use in starting and moving cars in and about depots, or wherever else a "dummy-locomotive" or draft-animals are not available.

In the accompanying drawings, forming part of this specification, Figures 1 and 2 represent portions of a car-truck with my improved implement applied to the wheel in two different positions, for moving the car in different directions. Fig. 3 is a plan view of the wheel and implement applied thereto, as shown in Fig. 1. Fig. 4 is a side view of the pivoted dog detached. Fig. 5 is an enlarged view of a portion of the dog, showing the clutch attached thereto.

In said drawings, A indicates a car-axle, and B one of the wheels mounted thereon. The lever C has a hook, D, which is constructed with a short projection or heel, $a$, opposite the longer arm or hook proper, $b$. The hook partly embraces the axle A when the implement is in use, and will not slip or become detached from the same.

The dog E is a bar, which is bifurcated at one end and provided with a clutch, F, at the other. It is pivoted to the hook D at or near its bifurcation, and its arms $c$ $c$ are curved on the outer edge, to adapt them to the circular form of the axle.

The clutch is formed of a hinged plate and a screw, $d$, which is adjusted by nuts $e$. The plate is hinged to the dog proper at the middle of its length, and its arms are at an obtuse angle to each other.

The screw $d$ and nuts $e$ are applied to the end of the dog E, so that by adjusting the nuts the other end of the clutch-plate F may be opened more or less, as required, to admit car-wheel flanges of different sizes or thicknesses. In using the implement it is applied as shown in Figs. 1 and 2.

In Fig. 1 the dog E extends forward from the lever C, and its clutch F engages the flange on the inner or rear side of the wheel B, so that when the free end of lever A is depressed (see dotted lines) the dog E will exert tractive force on the flange, and thus turn the wheel, so as to cause the car of which it forms a part to move in the direction indicated by the arrow—*i. e.*, toward the person operating the lever. In Fig. 2 the dog E is reversed in position, being inclined backward from hook D, so that its clutch engages the flange on the outer or front side of the wheel. Thus, when the lever A is raised the dog will exert tractive force on the wheel in the opposite direction and revolve it, thereby propelling the car in the direction of the double arrow, or from the person operating the lever.

In each position of the dog E one of its arms $c$ rests on the axle B, so that when the lever A is either raised, as in Fig. 1, or depressed, as in Fig. 2, the dog is converted into a lever, of which the pivot is the fulcrum, so that the clutch is caused to slide down on the wheel-flange and take a new hold.

The implement is light, easily handled, cheap, and efficient for its purpose.

What I claim is—

1. The device for moving cars by hand, consisting of the lever having a hook for attachment to the axle, and a dog which is pivoted to the lever and adapted for engagement with the flange or rim of a wheel, substantially as shown and described.

2. The dog having its pivot end bifurcated, in combination with the lever C, substantially as shown and described.

3. The combination, with the dog proper and the lever C, of a clutch consisting of a hinged angular plate, and means for adjusting the angle of the inner or free end of such plate, for the purpose specified.

4. The combination, with the dog and hinged angular plate, of the screw and nuts for adjusting and holding the plate fixed in any adjustment, as shown and described.

WILLIAM B. NEWLON.

Witnesses:
GEORGE MAXWELL,
GEORGE SHAPLAND.